United States Patent
Thusoo et al.

(10) Patent No.: US 6,895,487 B2
(45) Date of Patent: *May 17, 2005

(54) METHODS FOR INTRA-PARTITION PARALLELISM FOR INSERTS

(75) Inventors: Ashish Thusoo, San Mateo, CA (US); Benoit Dageville, Redwood Shores, CA (US); Allen Brumm, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/771,100

(22) Filed: Feb. 2, 2004

(65) Prior Publication Data

US 2004/0158570 A1 Aug. 12, 2004

Related U.S. Application Data

(63) Continuation of application No. 09/873,131, filed on May 31, 2001, now Pat. No. 6,687,798.

(51) Int. Cl.[7] .............................................. G06F 13/00
(52) U.S. Cl. ...................................... 711/173; 711/154
(58) Field of Search .................................. 711/154, 173

(56) References Cited

U.S. PATENT DOCUMENTS

| | | | |
|---|---|---|---|
| 5,555,388 A | | 9/1996 | Shaughnessy |
| 5,692,178 A | | 11/1997 | Shaughnessy |
| 5,864,512 A | | 1/1999 | Buckelew et al. |
| 5,956,704 A | * | 9/1999 | Gautam et al. ................ 707/1 |
| 5,963,933 A | | 10/1999 | Cheng et al. |
| 5,978,574 A | | 11/1999 | Sharma |
| 6,003,022 A | | 12/1999 | Eberhard et al. |
| 6,009,432 A | | 12/1999 | Tarin |
| 6,223,182 B1 | * | 4/2001 | Agarwal et al. ............ 707/102 |
| 6,411,951 B1 | | 6/2002 | Galindo-Legaria et al. |
| 6,418,437 B1 | * | 7/2002 | Cole .............................. 707/8 |
| 6,567,823 B1 | | 5/2003 | Rothschild |
| 6,654,756 B1 | * | 11/2003 | Quernemoen et al. ...... 707/100 |
| 6,687,798 B1 | * | 2/2004 | Thusoo et al. .............. 711/154 |

* cited by examiner

*Primary Examiner*—Reba I. Elmore
(74) *Attorney, Agent, or Firm*—Bingham McCutchen LLP (57) ABSTRACT

Methods of inserting data in parallel into a partitioned data storage object are disclosed. Multiple processes are used to insert the data, and multiple processes may insert data into the same partition at the same time. Write conflicts are avoided through use of buffers and a brokering scheme to manage the data flows into the partitioned data storage object. Also disclosed are methods to optimize the size of the buffers to minimize bottlenecks.

23 Claims, 10 Drawing Sheets

METHODS FOR INTRA-PARTITION PARALLELISM FOR INSERTS

CROSS-REFERENCE TO RELATED APPLICATION(S)

The present application is a Continuation of U.S. application Ser. No. 09/873,131, filed May 31, 2001, which will be issuing on Feb. 3, 2004 as U.S. Pat. No. 6,687,798, which is hereby incorporated by reference in its entirety.

FIELD OF THE INVENTION

The invention relates to computer systems, and more particularly to methods for inserting data into a data storage system.

BACKGROUND

The invention relates to inserting data items into a data storage object, such as inserting rows into a database table. One approach is serial insertion of rows, where the rows are inserted into a table one at a time, by a single data insertion unit, such as a database server or process ("server"). In this approach, a query is executed that selects the rows of data to be inserted into the target table and creates a result set for that query. The server then proceeds through the query result set, one row at a time. The server first selects a row from the result set. The server then searches the target table for an area of free space within the table large enough to store the row. Finally, the server writes the source row to the target table at the point where the server located sufficient free space. The server repeats these steps with every row in the result set. Since this method searches for and uses free space within the bounds of the existing data in the target object, it makes efficient use of the free space within the target object. However, since the server has to search the target database object every time it tries to insert another row, and since only one row can be inserted at a time, this method is quite slow.

Another approach for inserting rows of data into a data storage object, such as a table in a database, is a parallel insertion of rows into the data storage object. In this approach, a query is executed that selects the rows to be inserted into the target object and a result set is generated. Multiple insertion slave units then work on this result set to insert rows into the target object. From this point, the approach branches into two types of parallel inserts.

Figure 1A:
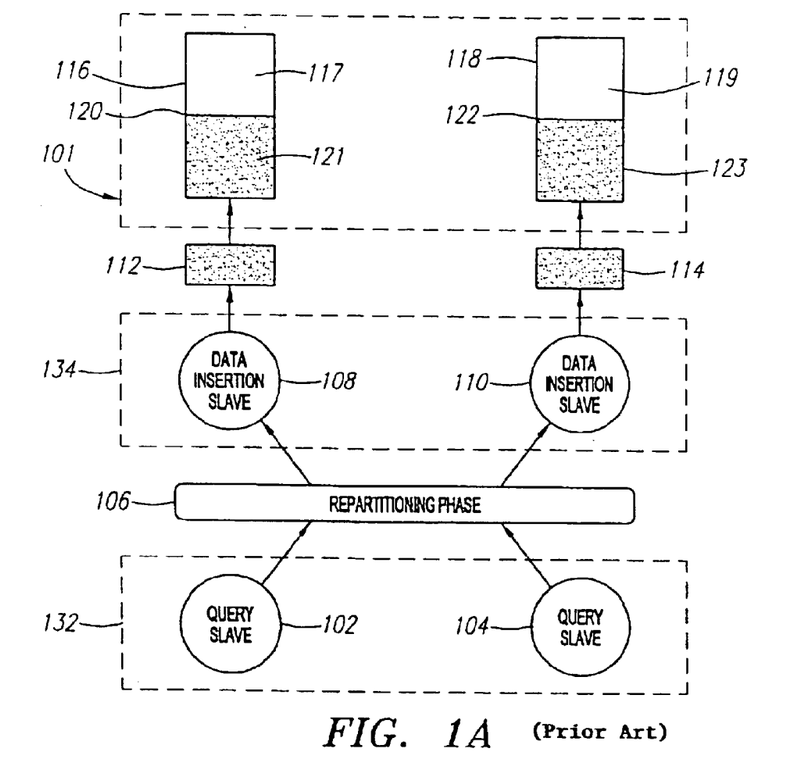
FIG. 1A depicts an approach for doing a parallel insert into a partitioned data storage object.

Referring to FIG. 1A, the first type of parallel insert, used where a data storage object 101 has been partitioned into partitions 116, 118, is an insert above a "high watermark". The high water marks 120, 122 are the points in the partitions 116, 118 above which no data has been stored. The high water marks 120, 122 divide the partitions 116, 118 into formatted spaces 121, 123 and unformatted spaces 117, 119. The formatted spaces 121, 123, which may or may not contain valid data, cannot be written to using parallel insertion methods. The unformatted spaces 117, 119 do not contain valid data, and can be written to using parallel insertion methods. During parallel execution of an insert into a partitioned data storage object 101, slave sets act on the data to be inserted. A query slave set 132 is a set of processes that execute the query and build the result set. A data insertion slave set 134 is a set of processes that receive the rows of data and insert them into the unformatted spaces 117, 119 of the partitions 116, 118 of the data storage object 101, above the high water mark pointers 120, 122. The query slave set 132 has query slaves 102, 104 that read the data to be inserted. The data insertion slave set 134 has data insertion slaves 108, 110 that insert the data into the partitions 116, 118.

A first data insertion slave 108 works on a first partition 116, and a second data insertion slave 110 works on a second partition 118. In the example of FIG. 1A, each data insertion slave 108, 110 works on only one partition 116, 118, and each partition 116, 118 has only one data insertion slave 108, 110 working on it. Alternatively, each data insertion slave can work on multiple partitions, as long as each partition is only worked on by one data insertion slave.

The rows read by the query slaves 102, 104 are typically processed in a random order. These rows, therefore, have to go through a repartitioning phase 106 where they are repartitioned and redistributed amongst the data insertion slaves 108, 110, such that the first data insertion slave 108 gets the rows of data to be inserted into the first partition 116 and the second data insertion slave 110 gets the rows of data to be inserted into the second partition 118. These rows are grouped into inserts 112, 114, which are inserted into the unformatted spaces 117, 119, above the high water marks 120, 122 of the corresponding partitions 116, 118 by the data insertion slaves 108, 110.

This first type of parallel insert is faster than the serial insert described above. The first type of parallel insert also avoids a write conflict, where multiple processes attempt to write data to the same location in the partition 116, 118 at the same time. However, if there is a data skew amongst the partitions 116, 118 then most of the data is being inserted into only a few partitions. This causes only one or a few slaves to actively do the insert, thus defeating the purpose of parallelism in inserts. Most of the data insertion slaves 108, 110 sit idle, which wastes system resources.

For example, in many applications a data storage object, such as a database table, is partitioned on a date column, with each partition containing a specified range of dates, such as a calendar year or a quarter. In these types of applications the rows are mainly inserted in the last (most recent dates) partition. Due to this, the data insertion slave working on the last partition needs to do much more work than other data insertion slaves.

Figure 1B:
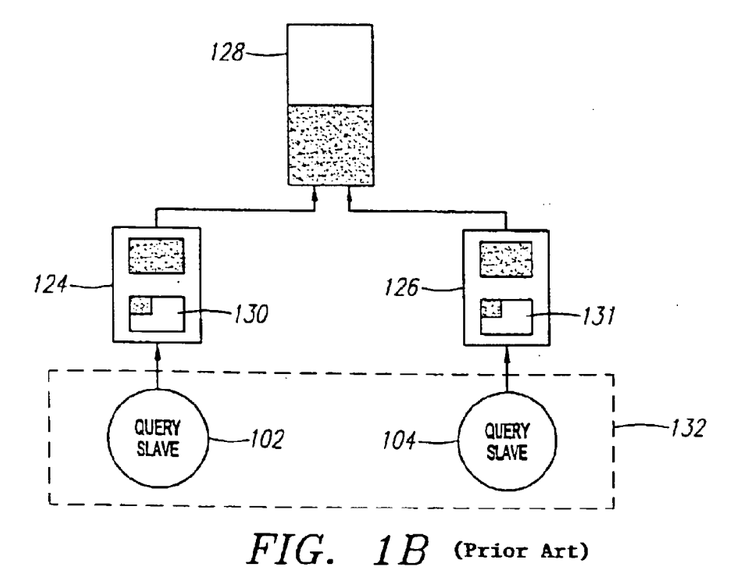
FIG. 1B depicts an approach for doing a parallel insert into a non-partitioned data storage object.

Referring now to FIG. 1B, the second type of parallel insert is used for a non-partitioned data storage object 128, such as a non-partitioned database table or single table fragment (a partition of a simple partitioned table or a sub-partition of a composite partitioned table). In this case a separate data insertion slave set is not needed; the query slave set 132 is responsible for both reading the data rows and doing the inserts. Each query slave 102, 104 is allocated a temporary storage area 124, 126 of memory and inserts all of the rows of data the query slave 102, 104 has read from the data source into its temporary storage area 124, 126. When the query has been completed, the temporary storage areas 124, 126 are merged into the non-partitioned data storage object 128.

This second type of parallel insert allows multiple query slaves 102, 104 to work on a single non-partitioned data storage object 128. Furthermore, the method avoids write conflicts, since each query slave 102, 104 only works on one temporary storage area 124, 126. During merging of the temporary storage areas 124, 126, each temporary storage area 124, 126 has an unused space 130, 131. This unused space 130, 131 is wasted when the temporary storage areas 124, 126 are merged into the non-partitioned data storage object 128. This wastage is not very significant for a single non-partitioned data storage object, but the wastage becomes very large if an extension of this technique is used for inserting data into a partitioned object. Thus methods are needed that allow multiple query slaves 102, 104 to work on a single partition 116, 118 of a partitioned data storage object 101, while avoiding write conflicts and minimizing space wastage.

SUMMARY OF THE INVENTION

The present invention is directed to methods for avoiding write conflicts and minimizing space wastage during parallel inserts of data into partitioned data storage objects.

In an aspect of an embodiment of the invention, temporary storage areas are used in conjunction with partitioned data storage objects, allowing multiple slaves to insert data into a single partition of the partitioned data storage object.

In an aspect of a preferred embodiment of the invention, the space above the high water mark becomes a brokered resource, allowing multiple slaves to insert data into a single partition of the data storage object.

In another aspect of a preferred embodiment of the invention, the size of the blocks of data to be inserted is dynamically determined.

In another aspect of a preferred embodiment of the invention, the block of data to be inserted is patched with information to allow direct writing of the block from short-term memory to a long-term storage device.

Further details of aspects, objects and advantages of the invention are described below in the detailed description, drawings and claims.

BRIEF DESCRIPTION OF THE DRAWINGS

The accompanying drawings are included to provide a further understanding of the invention and, together with the detailed description, serve to explain the principles of the invention.

DETAILED DESCRIPTION OF THE PREFERRED EMBODIMENTS

The present invention is directed to methods for avoiding write conflicts between multiple data insertion units during parallel inserts of data into partitioned data storage objects. For purposes of illustration, this explanation will discuss several embodiments of the invention. It will be apparent, however, to one skilled in the art that the invention may be practiced without these specific combinations or orders of elements/steps. The specifics of these embodiments are not intended to limit the scope of the invention to the particular elements of the illustrative embodiments.

In an embodiment, write conflicts are avoided by providing a set of temporary storage areas for each data insertion unit into which the data to be inserted is written. These temporary storage areas are then merged into the partitioned data storage object.

In a preferred embodiment, write conflicts are avoided by providing a shared storage area within each partition of the partitioned data storage object. This shared storage area is brokered amongst all of the data insertion units that are inserting data into a particular partition.

General Approach

Figure 2:
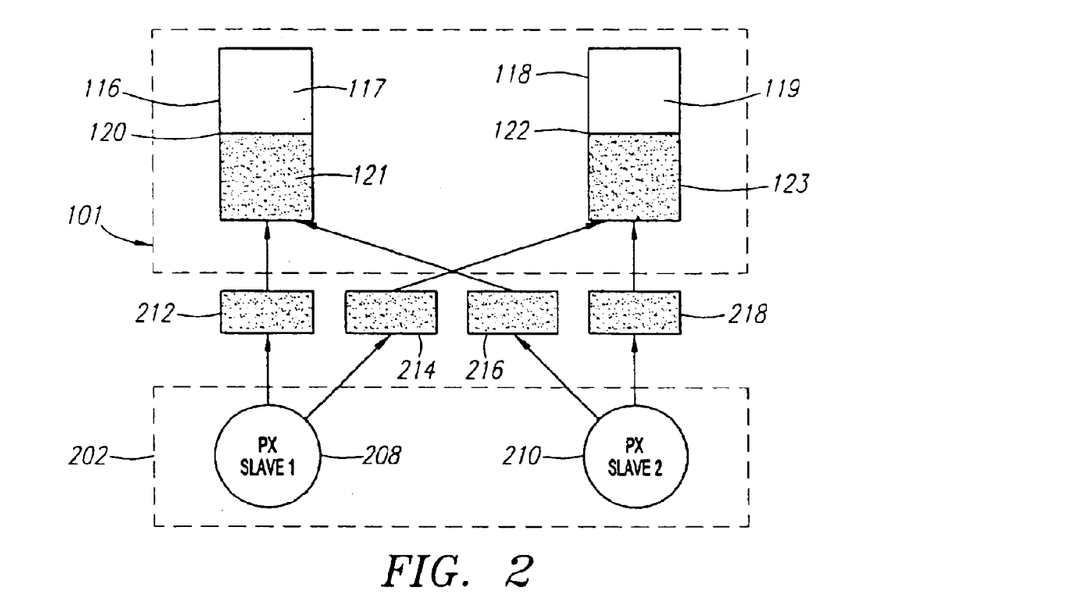
FIG. 2 depicts a generalized method for doing an intra-partition parallel insert into a partitioned data storage object according to an embodiment of the invention.

The general mode of operation for achieving intra-partition parallelism during inserts is illustrated in FIG. 2. This figure shows a partitioned data storage object 101, partitioned into a first partition 116 and a second partition 118. Each partition 116, 118 is defined by a partitioning definition, such that any row of data to be inserted can be allocated to either the first partition 116 or the second partition 118.

For example, assume that the database object 101 is a sales table for the calendar year 2000 having records that store, for every item sold, the date of sale, the location of the sale and the price charged. The partitioning definition for the first partition 116 specifies that all records with a date of sale between Jan. 1, 2000 and Jun. 30, 2000 belong in the first partition 116. The partitioning definition for the second partition 118 specifies that all records with a date of sale between Jul. 1, 2000 and Dec. 31, 2000 belong in the second partition 118. Thus a record is allocated to either the first partition 116 or the second partition 118, according to the date of sale stored in the record.

A data insertion unit set 202 includes PX slaves 208, 210. The data insertion unit set 202 is responsible for collecting the data to be inserted, and inserting the data into the data storage object 101. For the sake of illustration, two PX slaves 208, 210 are shown. Those skilled in the art will appreciate, however, that the invention is scaleable to any number of PX slaves 208, 210. Multiple PX slaves 208, 210 are also allowed to work on the same partition. Therefore it is not necessary to have a separate PX slave 208, 210 assigned to each partition 116, 118, as was the case for the approaches discussed above. Since any PX slave 208, 210 can insert data into any partition 116, 118, the repartitioning step 106 is also no longer necessary. With the repartitioning step 106 being removed, the PX slaves 208, 210 combine the functions of the query slaves 102, 104 and the data insertion slaves 108, 110 discussed above, thus eliminating the need for a separate query slave set 132 and data insertion slave set 134.

Turning to the operation of the individual PX slaves 208, 210, a first PX slave 208 gathers data by querying a database object. In an embodiment, a second PX slave 210, acting in parallel with the first PX slave 208, also gathers data by querying a database object. In another embodiment, the second PX slave 210 instead operates on a second query being executed at the same time as the first query. The first PX slave 208 and the second PX slave 210 gather query rows and groups them by the partition they will be inserted into. The first PX slave 208, upon completion of execution of the query it is processing, has collected a first row block insert 212 for insertion into the first partition 116 and a second row block insert 214 for insertion into the second partition 118. Similarly, the second PX slave 210, upon completion of the query it is processing, has collected a third row block insert 216 for insertion into the first partition 116 and a fourth row block insert 216 for insertion into the second partition 118. The two PX slaves 208, 210 both attempt to write their respective row blocks to the respective partitions, as shown by the arrows in FIG. 2. Row blocks 212, 216 are written to the first partition 116, and row blocks 214, 218 are written to the second partition 118. In the likely event that the first PX slave 208 and the second PX slave 210 both attempt to write to the first partition 116 at the same time, a write conflict will arise, as the first row block insert 212 and the third row block insert 216 are both written to the same location in the first partition 116. A similar write conflict arises in the second partition 118, when the PX slaves 208, 210 both attempt to write row block inserts 214, 218 to the same location in the second partition 118.

Temporary Storage Areas

Figure 3:
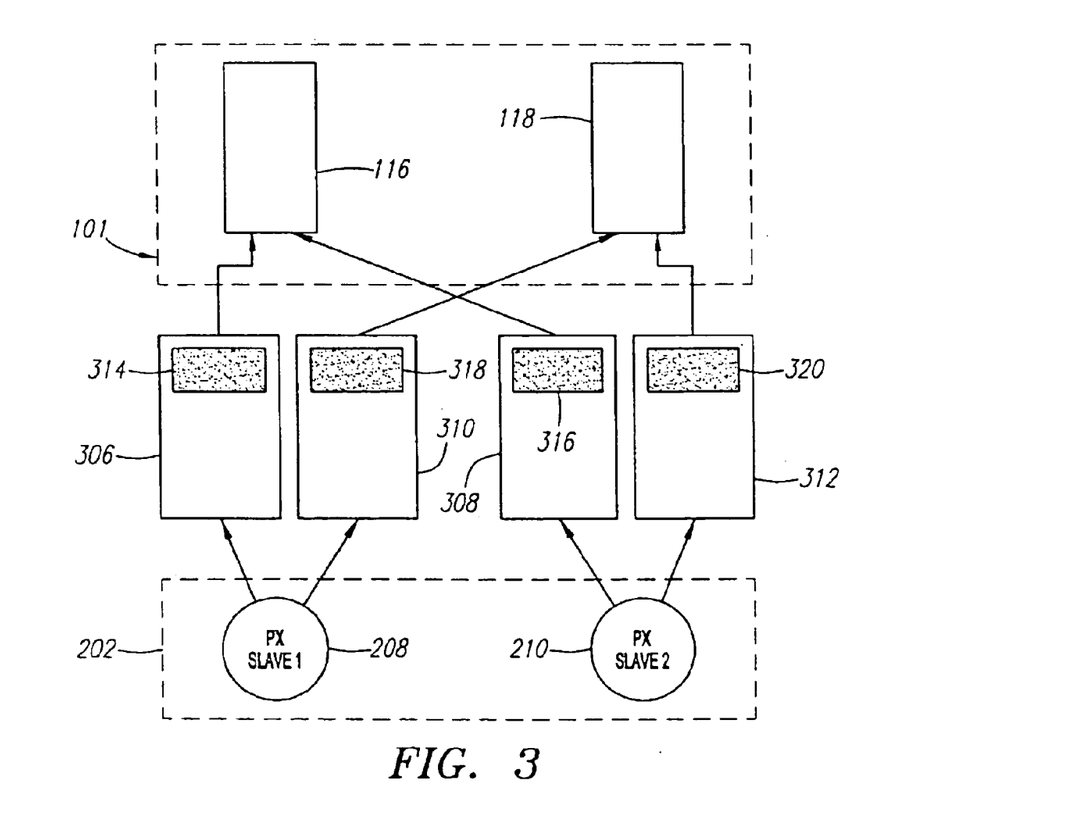
FIG. 3 shows the temporary storage areas assigned to the slaves doing an ultra-partition parallel insert into a partitioned data storage object, according to an embodiment of the invention.
Figure 4:
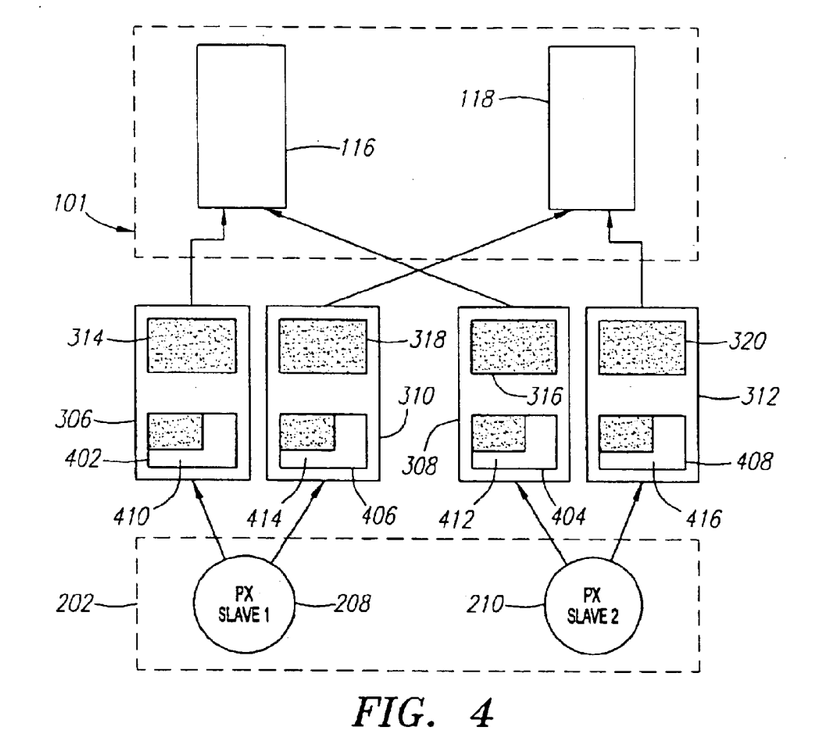
FIG. 4 shows the slaves populating the temporary storage areas, according to an embodiment of the invention.
Figure 5:
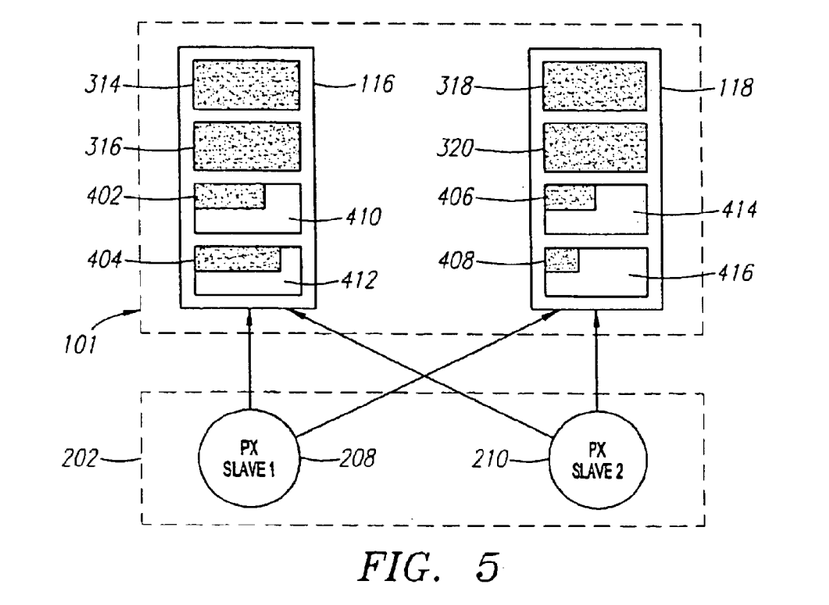
FIG. 5 shows the temporary storage areas merged into each partition, according to an embodiment of the invention.

In an embodiment of the invention, the write conflict discussed above is avoided by extending to partitioned data storage objects the method discussed above for inserting data in parallel into non-partitioned data storage objects using temporary storage areas. FIGS. 3–5 illustrate an embodiment of the invention using two PX slaves 208, 210 and two partitions 116, 118 in the partitioned database object 101. Those skilled in the art will appreciate that the invention is not limited to any particular number of PX slaves or any particular number of partitions. FIGS. 3–5 further illustrate an embodiment of the invention using a separate temporary storage area 306, 308, 310, 312 for each PX slave-partition pair. Those skilled in the art will appreciate that the invention is not limited to any particular number of temporary storage areas.

Referring to FIG. 3, the first PX slave 208 has associated with it a first temporary storage area 306 and a second temporary storage area 310. The first temporary storage area 306 holds all rows of data from the first PX slave 208 that will be written to the first partition 116. The second temporary storage area 310 holds all rows of data from the first PX slave 208 that will be written to the second partition 118.

The second PX slave 210 has associated with it a third temporary storage area 308 and a fourth temporary storage area 312. The third temporary storage area 308 holds all rows of data from the second PX slave 210 that will be written to the first partition 116. The fourth temporary storage area 312 holds all rows of data from the second PX slave 210 that will be written to the second partition 118.

In an embodiment, each temporary storage area 306, 308, 310 and 312 contains one extent 314, 316, 318, 320. An extent is a section of contiguous allocated storage space. The first temporary storage area 306 contains a first extent 314. The second temporary storage area 308 contains a second extent 316. The third temporary storage area 308 contains a third extent 318. The fourth temporary storage area 312 contains a fourth extent 320. As the PX slaves 208, 210 fill up the extents 314, 316, 318, 320 within the temporary storage areas 306, 308, 310, 312, the temporary storage areas 306, 308, 310, 312 will request and be allocated additional extents as needed. The particular methods of storing data within the temporary storage areas 306, 308, 310, 312 and of managing memory are design choices for those skilled in the art, and are not critical to the invention.

Referring to FIG. 4, the PX slaves 208, 210 have executed a query and filled the temporary storage areas 306, 308, 310, 312 with data. Extents 314, 316, 318, 320 have all been completely filled with data, as shown by their darkened interiors. The first temporary storage area 306 has been allocated a fifth extent 402. The second temporary storage area 308 has been allocated a sixth extent 404. The third temporary storage area 308 has been allocated a seventh extent 406. The fourth temporary storage area 312 has been allocated an eighth extent 408. The extents 402, 404, 406, 408 have all been partially filled with data. Each partially filled extent 402, 404, 406, 408 has unused memory space 410, 412, 414, 416 left over after the PX slaves 208, 210 have executed their queries.

Referring now to FIG. 5, once the PX slaves 208, 210 are finished processing their queries and the temporary storage areas 306, 308, 310, 312 have all been loaded with the data to be written to each partition 116, 118, then temporary storage areas 306, 308 are merged into the first partition 116 and temporary storage areas 310, 312 are merged into the second partition 118. The unused memory space 410, 412, 414, 416 left over in the partially filled extents 402, 404, 406, 408 is returned to a tablespace (not shown), the tablespace being the pool of memory available for use by the partitioned data storage object 101.

Figure 8:
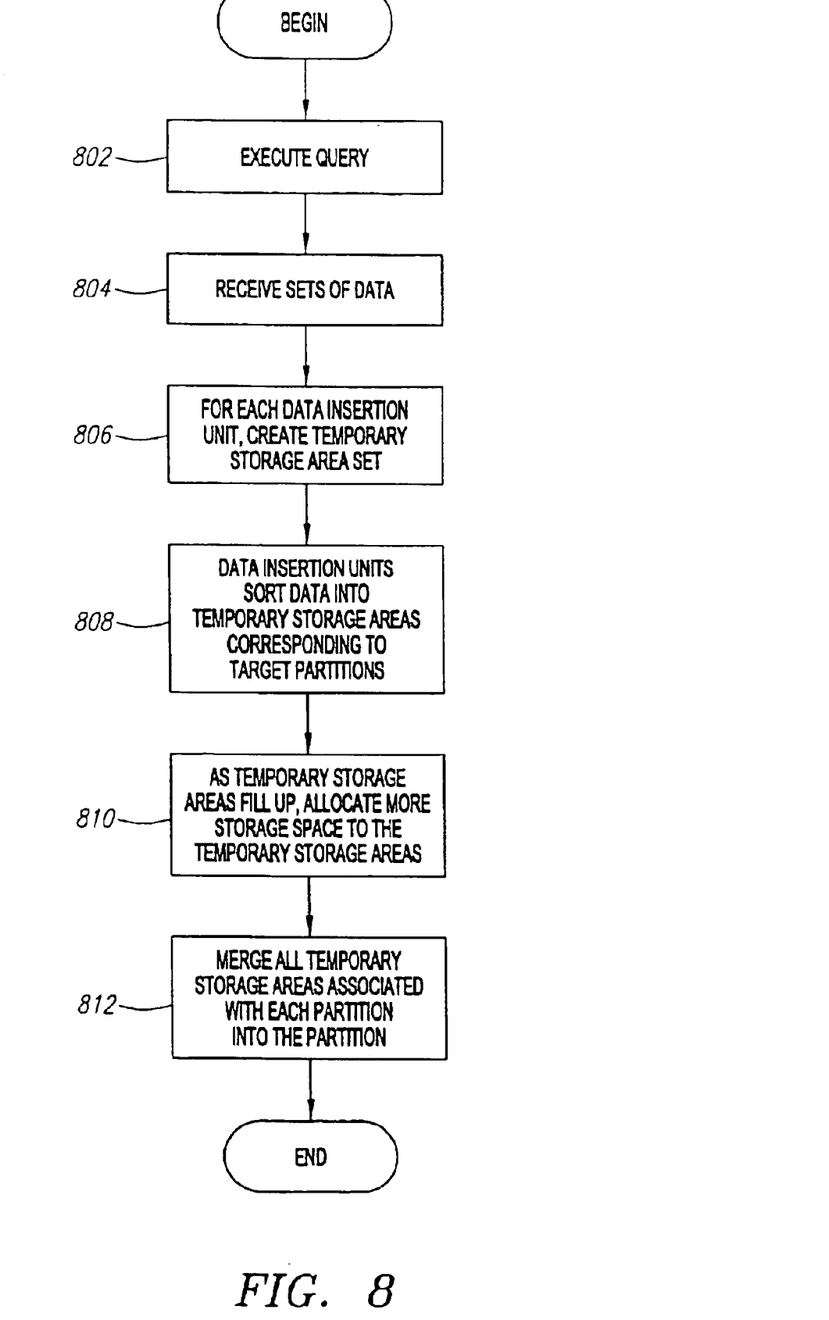
FIG. 8 is a flowchart of a method of performing an intra-partition parallel insert according to an embodiment of the invention.

Referring to the flowchart of FIG. 8, assume that a query is executed to insert all of the sales data from one store for the year 2000 into a master sales table for a company. The query is executed by the data insertion unit set 202, at step 802. The PX slaves 208, 210 gather rows of data to be inserted, at step 804. Each PX slave 208, 210 creates a set of temporary storage areas at step 806. Each PX slave 208, 210 creates one temporary storage area for each partition in the master sales table. In this example, each PX slave 208, 210 creates two temporary storage areas, as there are two partitions in the example sales table. Having created the temporary storage areas, the sales data for the store is now allocated amongst the temporary storage areas by the PX slaves 208, 210, at step 808. As the temporary storage areas fill with sales data, more extents are allocated to the temporary storage areas, to contain the additional sales data, at step 810.

In this example, the table is partitioned based upon the half of the year in which the sale took place. Therefore the sales data from the first half of the year that is extracted by the first PX slave 208 is allocated to the first temporary storage area 306. The sales data from the second half of the year that is extracted by the first PX slave 208 is allocated to the second temporary storage area 308. The sales data from the first half of the year that is extracted by the second PX slave 210 is allocated to the third temporary storage area 310. Finally, the sales data from the second half of the year that is extracted by the second PX slave 210 is allocated to the fourth temporary storage area 312.

Once the query is finished and the PX slaves 208, 210 have finished allocating the sales data to the temporary storage areas, the temporary storage areas are merged into the partitions 116, 118 of the sales table at step 812. In this example, the two temporary storage areas 306, 310 containing data from the first half of the year are merged into the first partition 116. The two temporary storage areas 308, 312 containing data from the second half of the year are merged into the second partition 118. The method then terminates.

Shared Storage Area

Figure 6A:
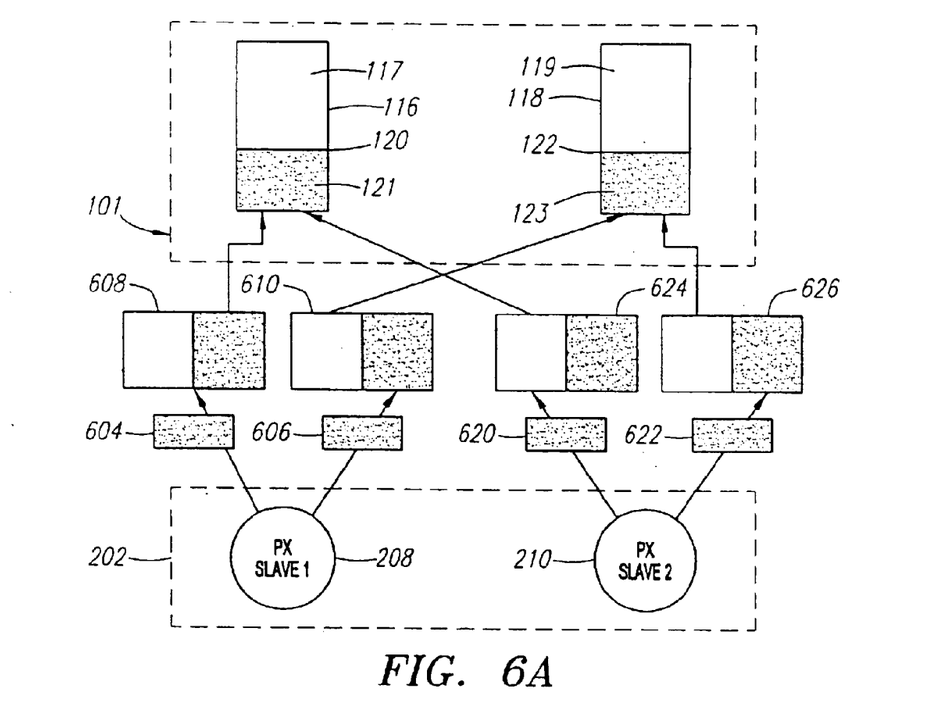
FIG. 6A shows slaves inserting rows of data into temporary storage areas, according to a preferred embodiment of the invention.
Figure 6B:
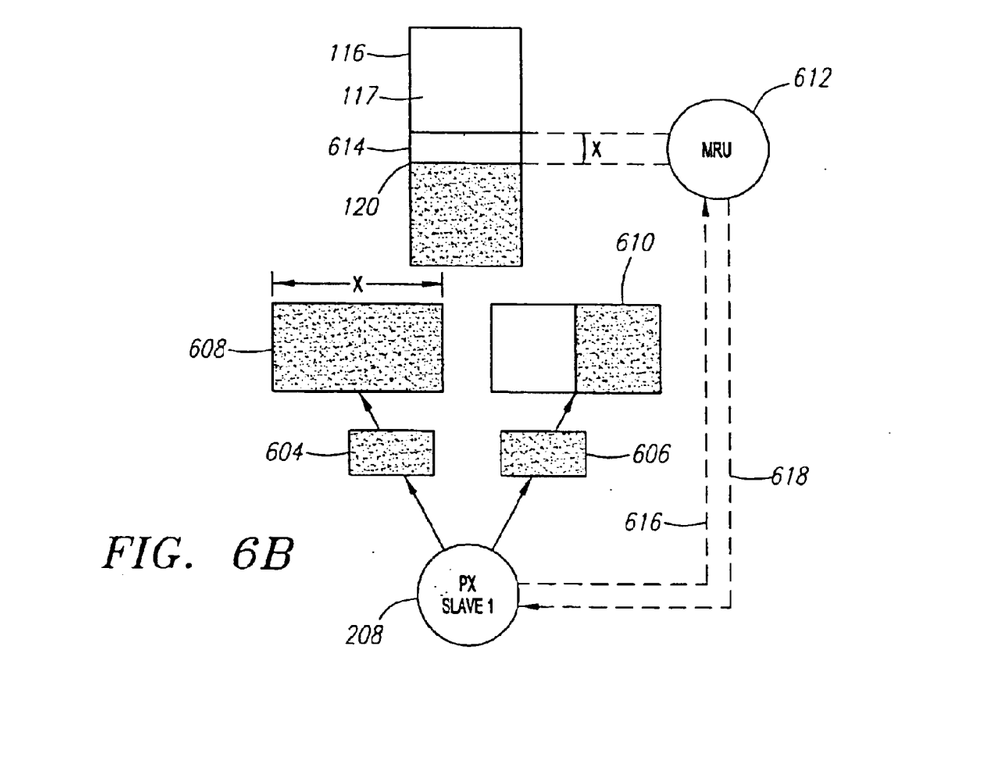
FIG. 6B shows a close-up of the space brokering process for one partition, according to a preferred embodiment of the invention.
Figure 6C:
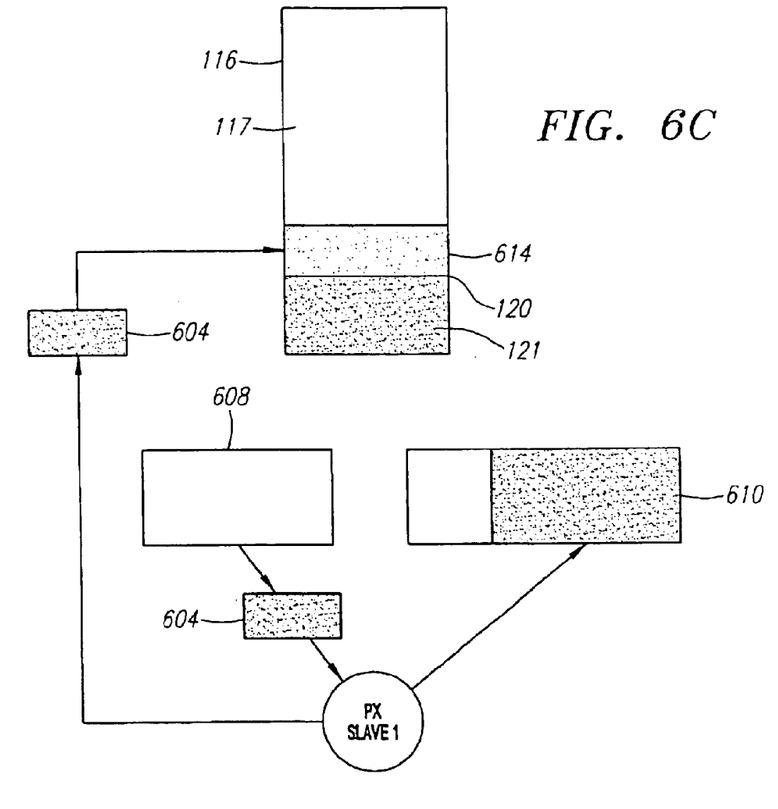
FIG. 6C shows a close-up of a slave inserting data into a partition, according to a preferred embodiment of the invention.

Referring to FIGS. 6A–6C, in a preferred embodiment of the invention, the write conflict discussed above is avoided by modifying the method discussed above for inserting data in parallel into a partitioned data storage object above a high water mark. This embodiment has unformatted spaces 117, 119. The unformatted spaces 117, 119 are the spaces above high water mark pointers 120, 122 in partitions 116, 118. In a preferred embodiment, the unformatted spaces 117, 119 are shared resources, rather than the exclusive resources of the method discussed above.

Turning to FIG. 6B, the first unformatted space 117 above the first high water mark pointer 120 is shared using a brokering mechanism 612. Although not shown, for sake of clarity, the second unformatted space 119 is shared in a similar manner. The brokering mechanism 612 distributes the first unformatted space 117 amongst the PX slaves 208, 210 that act on the first partition 116. In an embodiment, the brokering mechanism allocates to the PX slaves 208, 210 the exact amount of space (X) that the PX slaves 208, 210 require in order to complete their inserts. Determining the exact amount of space (X) that the PX slaves 208, 210 require is, however, not generally possible without actually executing the query first, which is highly inefficient. Therefore, in a preferred embodiment, a buffering mechanism is used, as shown in FIGS. 6A–6C.

Turning to FIG. 6A, the first PX slave 208 is allocated temporary storage areas 608, 610 for the partitions 116, 118 that it can insert into. The second PX slave 210 is allocated temporary storage areas 624, 626 for the partitions 116, 118 that it can insert into. In a preferred embodiment, these temporary storage areas 608, 610, 624, 626 are in-memory buffers. In another embodiment, the temporary storage areas 608, 610, 624, 626 are located on a long-term storage device. The precise nature of the temporary storage areas 608, 610, 624, 626 is a design choice for those skilled in the art, and is not critical to the invention. The PX slaves 208, 210, while executing their queries, collect rows of data 604, 606, 620, 622. The rows of data 604, 606, 620, 622 are loaded into the temporary storage areas 608, 610, 624, 626 as they are collected by the PX slaves 208, 210.

Referring to FIG. 6B, the first temporary storage area 608 has been completely filled with data. Once the first temporary storage area 608 is full, the first PX slave 208 sends a request 616 to a brokering mechanism 612, asking the brokering mechanism 612 to reserve a first block of space 614 in the first unformatted space 117 above the first high water mark pointer 120 in the first partition 116. The brokering mechanism 612 reserves the first block of space 614 and sends a response 618 back to the first PX slave 208, telling the first PX slave 208 that the reserved first block of space 614 has been reserved. Since the size (X) of the first temporary storage area 608 is known ahead of time, in a preferred embodiment the first block of space 614 is allocated a size (X) that exactly contains the contents of the first temporary storage area 608. In another embodiment, the size of the first block of space 614 is larger than the size of the first temporary storage area 608. By allocating the first block of space 614 to be the exact size (X) of the first temporary storage area 608, fragmentation of the tablespace (not shown) from whence the memory is allocated is minimized. When the query finishes processing, each temporary storage area may be partially filled with data. To minimize space wastage, for these partially-filled temporary storage areas the block of space reserved in the partition is allocated to be as close as possible to the size of the partially-filled temporary storage area.

Once the first PX slave 208 is granted the first block of space 614, the first PX slave 208 proceeds to insert the contents of the first temporary storage area 608 into the first block of space 614, as shown in FIG. 6C. When the second PX slave 210 fills the third temporary storage area 624, the second PX slave 210 follows the above described method to reserve a second block of space (not shown) in the first partition 116. The first block of space 614 is reserved solely for the use of first PX slave 208, and the second block of space (not shown) is reserved solely for the use of the second PX slave 210. The second PX slave 210 is therefore able to insert data into the first partition 116 simultaneously with the first PX slave 208, without precipitating a write conflict. By immediately reserving space in the partition for the filled temporary storage areas to copy their contents into, it is not necessary to allocate additional temporary storage areas. Thus a potential bottleneck in the process that allocates memory is avoided.

Figure 7A:
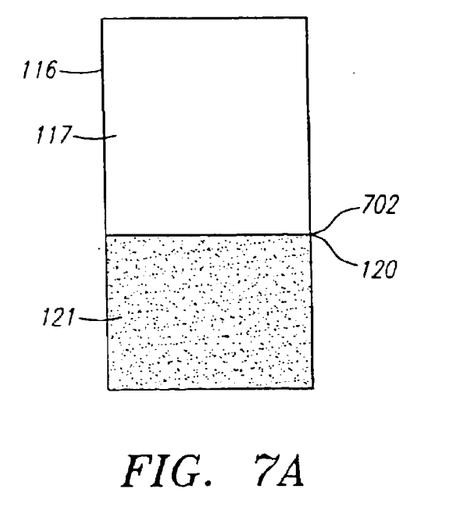
FIG. 7A shows a close-up of one partition in an initial state, before the slaves have started inserting data, according to a preferred embodiment of the invention.

The state of the first partition 116 over an exemplary series of inserts done in accordance with a preferred embodiment is shown in FIG. 7A–7E. In FIG. 7A, the initial state of the first partition 116 is shown. The first high water mark 120 divides the first partition 116 into the first unformatted space 117 and the first formatted space 121. An insertion location pointer 702 initially points to the same location as the first high water mark pointer 120. The insertion location pointer 702 is maintained in the brokering mechanism 612. In a preferred embodiment, each partition 116, 118 has associated with it an instance of the brokering mechanism 612, which contains the insertion location pointer 702. In another embodiment, the insertion location pointers are all maintained in one instance of the brokering mechanism 612 that is centralized for the entire partitioned data storage object 101.

Figure 7B:
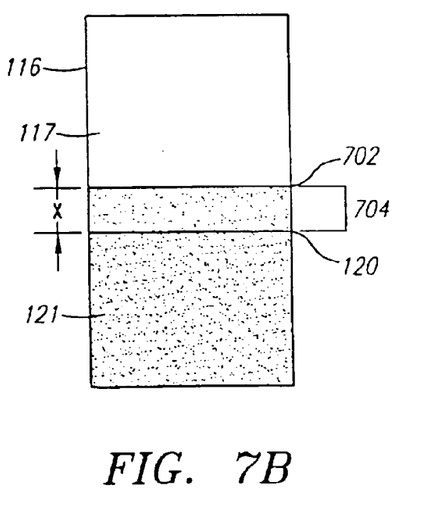
FIG. 7B shows a close up of one partition after a first slave has inserted data into the partition, according to a preferred embodiment of the invention.
Figure 7C:
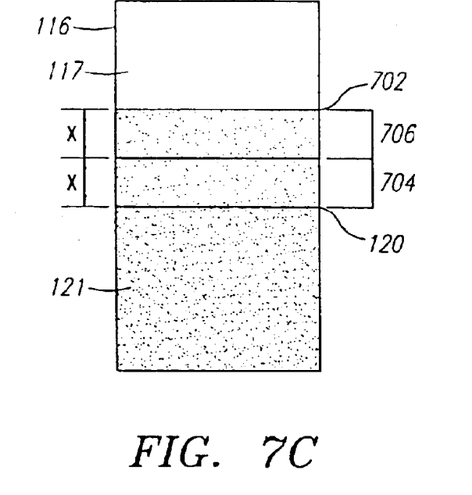
FIG. 7C shows a close up of one partition after a second slave has inserted data into the partition, according to a preferred embodiment of the invention.
Figure 7D:
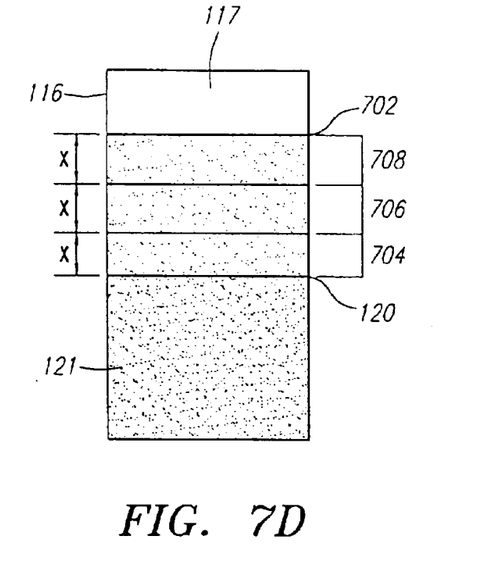
FIG. 7D shows a close up of one partition after the first slave has inserted more data into the partition, according to a preferred embodiment of the invention.

In FIG. 7B, the first PX slave 208 inserts a first data block 704 into the first partition 116. The insertion location pointer 702 is incremented to point to the location just above the first data block 704. Since the PX slaves 208, 210 are still in the process of inserting, the first high water mark pointer 120 is not altered. Maintaining the status of the first high water mark pointer 120 during insertion allows the insertion to be easily rolled back in the event of an error. In FIG. 7C, the second PX slave 210 has inserted a second data block 706 into the first partition 116. The insertion location pointer 702 is incremented to point to the location just above the second data block 706. In FIG. 7D, the first PX slave 208 has inserted a third data block 708 into the first partition 116. The insertion location pointer 702 is incremented to point to the location just above the third data block 708.

Figure 7E:
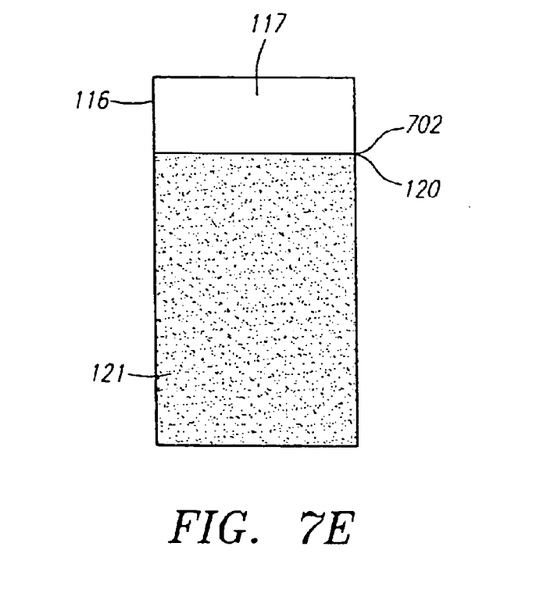
FIG. 7E shows a close up of one partition after the slaves have completed their inserts, according to a preferred embodiment of the invention.

In FIG. 7E, the PX slaves 208, 210 have completed their queries. The first high water mark pointer 120 is now incremented to point to the same location as that pointed to by the insertion location pointer 702. As the exemplary embodiment of the method concludes, the first partition 116 is now in a ready state, awaiting more data to be inserted.

Figure 9:
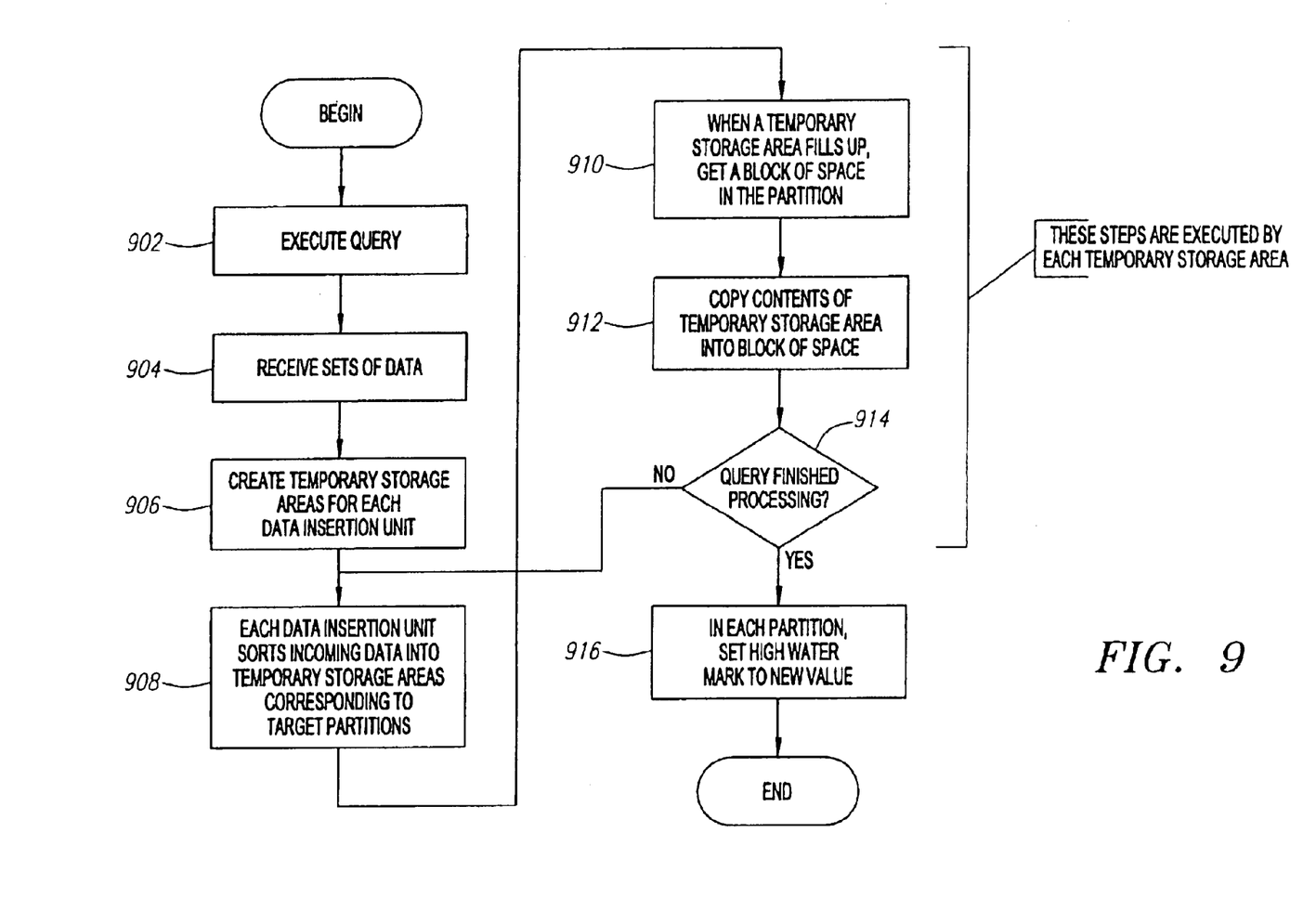
FIG. 9 is a flowchart of a method of performing an intra-partition parallel insert according to a preferred embodiment of the invention.

Referring to the flowchart of FIG. 9, a new query commences execution at step 902. The query gathers the rows of data to be inserted into the partitioned data object and the sets of data are sent to the data insertion units at step 904. Each data insertion unit creates a set of temporary storage areas, one area for each partition in the partitioned data object, at step 906. Each data insertion unit partitions the received sets of data into the data insertion unit's associated set of temporary storage areas, at step 908. Each member of the set of data is routed to the temporary storage area associated with the partition the member will be inserted into.

As the various temporary storage areas fill up with data, they will each execute the next series of steps. At step 910, a filled temporary storage area gets a block of unformatted space from the partition associated with the temporary storage area. At step 912, the contents of the temporary storage area are copied into the block of unformatted space. At step 914, a check is made to see if the query is finished processing.

If not, then control returns to step 908, where more data is inserted into the temporary storage area. If so, then at step 916 the high water marks for each partition are set to a new value reflecting the current division between unformatted space and formatted space for each partition. The method then terminates.

In an embodiment, the temporary storage areas 306, 308, 310, 312, 608, 610, 624, 626 are in-memory buffers. In this embodiment, the data stored in the temporary storage areas 306, 308, 310, 3 12, 608, 610, 624, 626 is patched with disk location related information, and then the data is written directly from the temporary storage areas 306, 308, 310, 312, 608, 610, 624, 626 to a long-term storage device, such as a hard disk. This embodiment avoids the necessity of copying the data from the temporary storage area to a buffer for the long-term storage device, before sending the data to the long-term storage device. The disk location related information includes, for example, row identifiers, chaining stubs for chained rows, block headers, and/or index buffers. The particular disk location related information used to patch the data is a design choice for those skilled in the art, based upon the particular nature of the long-term storage device used and other implementation-specific decisions, and is not critical to the invention.

Returning to FIG. 6B–6C, in an embodiment, the size (X) of the first temporary storage area 608 is allocated dynamically. The size (X) of the first temporary storage area 608 is determined by comparing the time it takes for the broker mechanism 612 to receive the request to allocate the first block of space 614 with the time it takes for the first PX slave 208 to insert the contents of the first temporary storage area 608 into the first block of space 614. The size (X) of the first temporary storage area 608 is allocated to be at least large enough that the time the PX slave 208 will take to insert the contents of the first temporary storage area 608 into the first block of space 614 is longer than the time required for the broker mechanism 612 to receive the request to allocate another block of space. Thus, the broker mechanism 612 will not have multiple allocations waiting to be processed. The average time required to allocate blocks of space and the average time required to insert the contents of a temporary storage area into a block of space are continuously computed. The sizes of the temporary storage areas are adjusted, based upon these computations, to minimize the risk of a bottleneck in the broker mechanism 612.

In a preferred embodiment, the size (X) is computed according to the following formula:

$$X > 2 \times \lambda T_w$$

Where $\lambda$ is the average time taken for the PX slave to insert the rows of data, and $T_w$ is the average time taken for the broker mechanism to receive the request for a block of space.

System Architecture Overview

Figure 10:
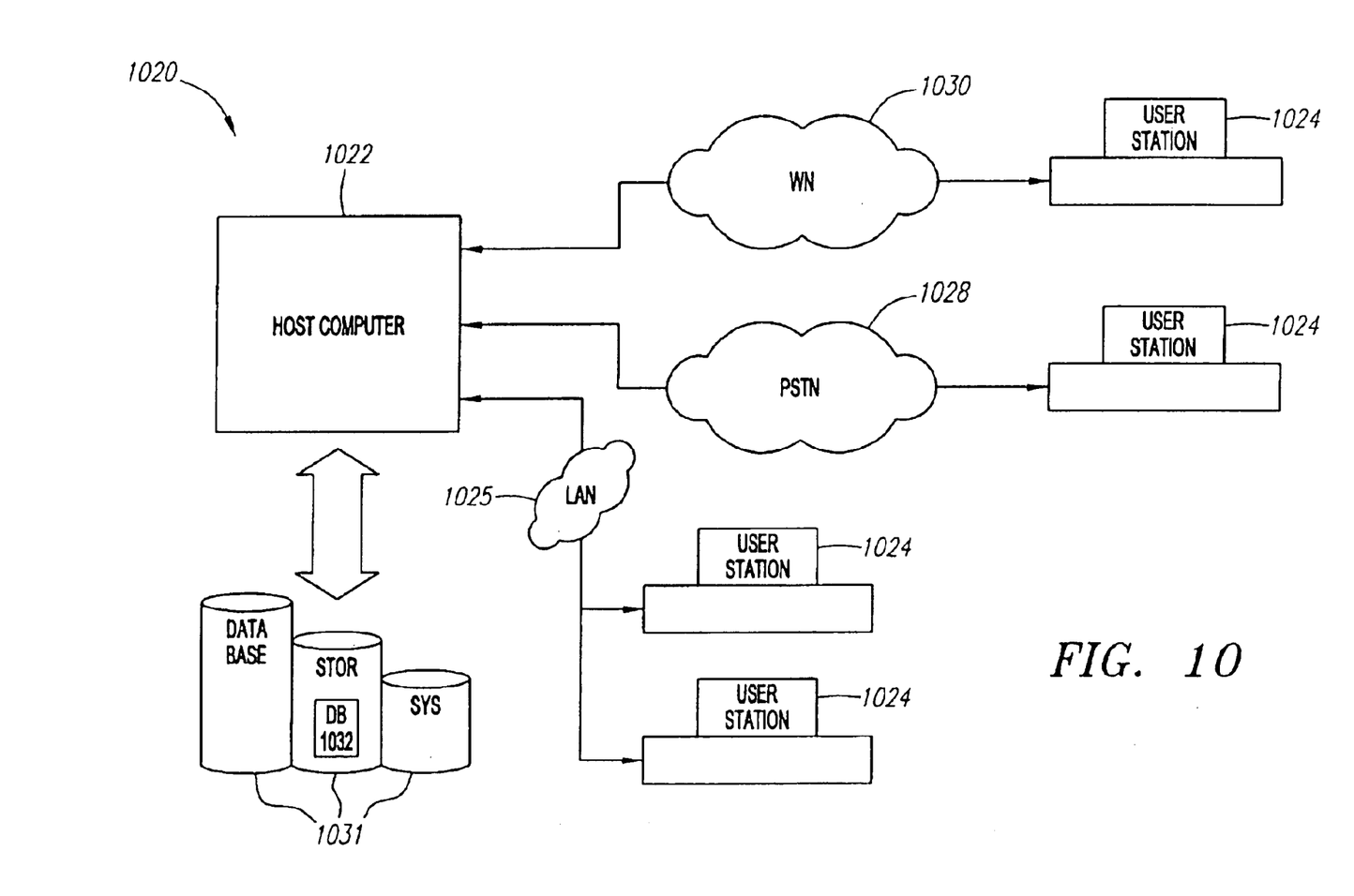
FIG. 10 is a representation of a computer system in accordance with an embodiment of the invention.

Referring to FIG. 10, in an embodiment, a computer system 1020 includes a host computer 1022 connected to a plurality of individual user stations 1024. In an embodiment, the user stations 1024 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1024 are connected to the host computer 1022 via a local area network ("LAN") 1025. Other user stations 1024 are remotely connected to the host computer 1022 via a public telephone switched network ("PSTN") 1028 and/or a wireless network 1030.

In an embodiment, the host computer 1022 operates in conjunction with a data storage system 1031, wherein the data storage system 1031 contains a database 1032 that is readily accessible by the host computer 1022.

In alternative embodiments, the database 1032 may be resident on the host computer, stored, e.g., in the host computer's ROM, PROM, EPROM, or any other memory chip, and/or its hard disk. In yet alternative embodiments, the database 1032 may be read by the host computer 1022 from one or more floppy disks, flexible disks, magnetic tapes, any other magnetic medium, CD-ROMs. any other optical medium, punchcards, papertape, or any other physical medium with patterns of holes, or any other medium from which a computer can read.

In an alternative embodiment, the host computer 1022 can access two or more databases 1032, stored in a variety of mediums, as previously discussed.

Figure 11:
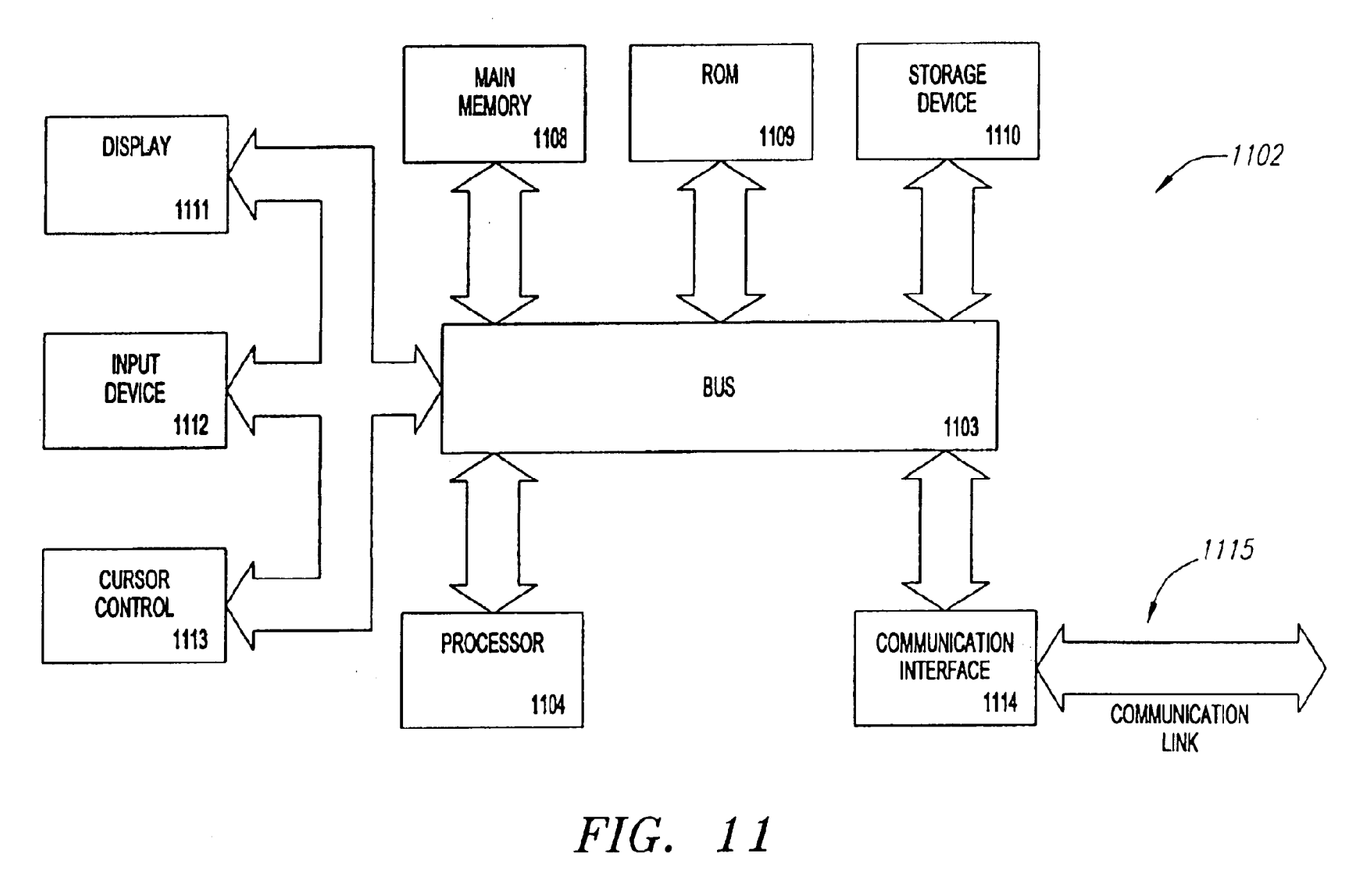
FIG. 11 is a representation of a processing unit in accordance with an embodiment of the invention.

Referring to FIG. 11, in an embodiment, each user station 1024 and the host computer 1022, each referred to generally as a processing unit, embodies a general architecture 1102. A processing unit includes a bus 1103 or other communication mechanism for communicating instructions, messages and data, collectively, information, and one or more processors 1104 coupled with the bus 1103 for processing information. A processing unit also includes a main memory 1108, such as a random access memory (RAM) or other dynamic storage device, coupled to the bus 1103 for storing dynamic data and instructions to be executed by the processor(s) 1104. The main memory 1108 also may be used for storing temporary data, i.e., variables, or other intermediate information during execution of instructions by the processor(s) 1104.

A processing unit may further include a read only memory (ROM) 1109 or other static storage device coupled to the bus 1103 for storing static data and instructions for the processor(s) 1104. A storage device 1110, such as a magnetic disk or optical disk, may also be provided and coupled to the bus 1103 for storing data and instructions for the processor(s) 1104.

A processing unit may be coupled via the bus 1103 to a display device 1111, such as, but not limited to, a cathode ray tube (CRT), for displaying information to a user. An input device 1112, including alphanumeric and other keys, is coupled to the bus 1103 for communicating information and command selections to the processor(s) 1104. Another type of user input device may include a cursor control 1113, such as, but not limited to, a mouse, a trackball, a fingerpad, or cursor direction keys, for communicating direction information and command selections to the processor(s) 1104 and for controlling cursor movement on the display 1111.

According to one embodiment of the invention, the individual processing units perform specific operations by their respective processor(s) 1104 executing one or more sequences of one or more instructions contained in the main memory 1108. Such instructions may be read into the main memory 1108 from another computer-usable medium, such as the ROM 1109 or the storage device 1110. Execution of the sequences of instructions contained in the main memory 1108 causes the processor(s) 1104 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1104. Such a medium may take many forms, including, but not limited to, non-volatile, volatile and transmission media. Non-volatile media, i.e., media that can retain information in the absence of power, includes the ROM 1109. Volatile media, i.e., media that can not retain information in the absence of power, includes the main memory 1108. Transmission media includes coaxial cables, copper wire and fiber optics, including the wires that comprise the bus 1103. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1104 can retrieve information.

Various forms of computer-usable media may be involved in providing one or more sequences of one or more instructions to the processor(s) 1104 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1103 may receive the infrared signals and place the instructions therein on the bus 1103. The bus 1103 may carry the instructions to the main memory 1108, from which the processor(s) 1104 thereafter retrieves and executes the instructions. The instructions received by the main memory 1108 may optionally be stored on the storage device 1110, either before or after their execution by the processor(s) 1104.

Each processing unit may also include a communication interface 1114 coupled to the bus 1103. The communication interface 1114 provides two-way communication between the respective user stations 1024 and the host computer 1022. The communication interface 1114 of a respective processing unit transmits and receives electrical, electromagnetic or optical signals that include data streams representing various types of information, including instructions, messages and data.

A communication link 1115 links a respective user station 1024 and a host computer 1022. The communication link 1115 may be a LAN 1025, in which case the communication interface 1114 may be a LAN card. Alternatively, the communication link 1115 may be a PSTN 1028, in which case the communication interface 1114 may be an integrated services digital network (ISDN) card or a modem. Also, as a further alternative, the communication link 1115 may be a wireless network 1030.

A processing unit may transmit and receive messages, data, and instructions, including program, i.e., application, code, through its respective communication link 1115 and communication interface 1114. Received program code may be executed by the respective processor(s) 1104 as it is received, and/or stored in the storage device 1110, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A method for avoiding write conflicts during a parallel insertion of a plurality of sets of data into a partitioned data storage object, the parallel insertion using a plurality of data insertion units, the partitioned data storage object having a plurality of partitions, comprising:

receiving the plurality of sets of data, creating for each data insertion unit a temporary storage area for each of the plurality of partitions into which the data insertion unit will be inserting a set of data, storing the plurality of sets of data into the temporary storage areas; and patching the plurality of sets of data with information to allow the data to be directly written to a long-term storage device.

2. The method of claim 1 in which the temporary storage area for each of the plurality of partitions is an in-memory buffer.

3. The method of claim 1 in which the long term storage device is a hard disk.

4. The method of claim 1 in which the information comprises a row identifier, a chaining stub for chained rows, a block header, or an index bugger.

5. The method of claim 1 in which the plurality of sets of data are written directly from the temporary storage areas to the long term storage device.

6. The method of claim 5 in which the plurality of sets of data are written directly from the temporary storage areas to the long term storage device without copying into a buffer.

7. The method of claim 1, wherein storing the plurality of sets of data in the temporary storage areas further comprises:

writing a subset of each set of data into the temporary storage area associated with the partition that the subset of data will be inserted into.

8. The method of claim 7, further comprising:

merging into each partition all of the temporary storage areas associated with the partition.

9. The method of claim 7, wherein the plurality of data insertion units are slaves.

10. A method for performing parallel insertion of a plurality of sets of data into a partitioned data storage object, the partitioned data storage object having a plurality of partitions, comprising:

receiving a plurality of sets of data to write into a long term storage device, creating one or more temporary storage areas, and storing the plurality of sets of data into the temporary storage areas.

11. The method of claim 10 further comprising:

patching the plurality of sets of data with information to allow the data to be directly written to a long-term storage device.

12. The method of claim 11 in which the temporary storage area for each of the plurality of partitions is an in-memory buffer.

13. The method of claim 11 in which the long term storage device is a hard disk.

14. The method of claim 11 in which the information comprises a row identifier, a chaining stub for chained rows, a block header, or an index bugger.

15. The method of claim 11 which the plurality of sets of data are written directly from the temporary storage areas to the ion term storage device.

16. The method of claim 15 in which the plurality of sets of data are written directly from the temporary storage areas to the long term storage device without copying into a buffer.

17. The method of claim 10, wherein storing the plurality of sets of data in the temporary storage areas further comprises:

writing a subset of each set of data into the temporary storage area associated with the partition that the subset of data will be inserted into.

18. The method of claim 17, further comprising:

merging into each partition all of the temporary storage areas associated with the partition.

19. The method of claim 10, further comprising:

storing the plurality of sets of data in the temporary storage areas into appropriate partitions.

20. A computer program product comprising a medium useable by a processor, the medium comprising a sequence of instructions which, when executed by said processor, causes said processor to execute a method for avoiding write conflicts during a parallel insertion of a plurality of sets of data into a partitioned data storage object, the parallel insertion using a plurality of data insertion units, the partitioned data storage object having a plurality of partitions, the method comprising:

receiving the plurality of sets of data, creating for each data insertion unit a temporary storage area for each of the plurality of partitions into which the data insertion unit will be inserting a set of data, storing the plurality of sets of data into the temporary storage areas; and patching the plurality of sets of data with information to allow the data to be directly written to a long-term storage device.

21. A system for avoiding write conflicts during a parallel insertion of a plurality of sets of data into a partitioned data storage object, the parallel insertion using a plurality of data insertion units, the partitioned data storage object having a plurality of partitions, comprising:

means for receiving the plurality of sets of data, means for creating for each data insertion unit a temporary storage area for each of the plurality of partitions into which the data insertion unit will be inserting a set of data, means for storing the plurality of sets of data into the temporary storage areas; and means for patching the plurality of sets of data with information to allow the data to be directly written to a long-term storage device.

22. A computer program product comprising a medium useable by a processor, the medium comprising a sequence of instructions which, when executed by said processor, causes said processor to execute a method for performing parallel insertion of a plurality of sets of data into a partitioned data storage object, the partitioned data storage object having a plurality of partitions, the method comprising:

receiving a plurality of sets of data to write into a long term storage device, creating one or more temporary storage areas, and storing the plurality of sets of data into the temporary storage areas.

23. A system for performing parallel insertion of a plurality of sets of data into a partitioned data storage object, the partitioned data storage object having a plurality of partitions, the method comprising:

means for receiving a plurality of sets of data to write into a long term storage device, means for creating one or more temporary storage areas, and means for storing the plurality of sets of data into the temporary storage areas.

* * * * *